Patented Dec. 11, 1951

2,578,537

UNITED STATES PATENT OFFICE 2,578,537

AMINE SALT OF PENICILLIN

Alphonse P. Granatek, Syracuse, N. Y., assignor to Bristol Laboratories Inc., Syracuse, N. Y., a corporation of New York No Drawing. Application December 8, 1949, Serial No. 131,928

2 Claims. (Cl. 260—239.1)

The present invention relates to a new amine salt of penicillin, more particularly orthobenzylphenyl dimethylaminoethyl ether penicillin which is capable of exerting a repository antibiotic action, and is also useful for oral administration, and for external application.

The new penicillin salt of the present invention has the following formula

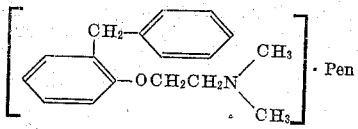

wherein Pen designates an acid penicillin radical or an active moiety thereof, capable of forming an addition salt with orthobenzylphenyl dimethylaminoethyl ether.

A more comprehensive understanding of this invention is obtained by reference to the following examples.

Example 1

Sodium methylate is made by dropping 11.7 grams of sodium strips into 199 ml. of absolute methanol in a 1-liter three-necked flask. 93.9 grams of orthobenzylphenol are dissolved in 200 ml. of dry toluene and added to the sodium methylate solution. The solution is distilled until the boiling point of toluene is reached. At the end of the distillation, enough toluene is added to restore the original volume of solvent.

109.5 grams of dimethylaminoethyl chloride hydrochloride are put with 200 ml. of toluene in a 1-liter Erlenmeyer flask, cooled in an ice bath, and decomposed with 167.5 grams of 20% sodium hydroxide solution. The toluene and water layers are separated, and the water layer is extracted again with 50 ml. of toluene. The toluene layers are combined, washed with saturated salt solution, and dried over anhydrous potassium carbonate.

The dried dimethylaminoethyl chloride solution is poured into the toluene solution of the sodium salt of o-benzylphenol, heated to reflux, and refluxed 16 hours. After refluxing, enough water is added to the mixture to dissolve the precipitated solid. The layers are separated, and the toluene layer is further washed with water until the water extract is just slightly alkaline. The toluene solution is then made acid with 6 N hydrochloric acid and extracted with water until no cloudiness is produced when the extract is made alkaline. The acidic aqueous extract is washed with ether, then made alkaline with 20% sodium hydroxide solution, and extracted with ether. The ether solution is washed several times with water, then with saturated salt solution, and is dried over anhydrous potassium carbonate. The dried solution is filtered and distilled. The product distills at 143.5° C. at 1 mm. of mercury pressure, 69.7 grams of pale yellow oil are recovered.

57.1 grams of the free base are dissolved in ether and precipitated with dry HCl. 66.0 of crude hydrochloride are recovered. The hydrochloride is dissolved in 130 ml. of reagent acetone by boiling, filtered hot, and allowed to cool. The crystalline material obtained on cooling is filtered, washed with a little acetone, washed with ether, and dried under vacuum. 44.8 grams, M. P. 119.5 to 121° C., are recovered from the first crop of crystals. Ethyl acetate may also be used as the solvent for recrystallization.

Analysis of the hydrochloride:

|   | Calculated | Found |
|---|---|---|
|   | Percent | Percent |
| C | 70.18 | 70.0 |
| H | 7.6 | 7.22 |
| N | 4.81 | 4.58 |

5.4 grams of orthobenzylphenyl dimethylaminoethyl ether hydrochloride were prepared by the above procedure, added to ether and made basic with sodium hydroxide. A second solution was prepared by adding 6.6 grams of potassium penicillin to ether and acidifying by the addition of phosphoric acid. Both ether extracts were then dried under anhydrous sodium sulfate, filtered and then added together. The resulting solution was scratched with a laboratory stirring rod and refrigerated for a period of six days. A viscous oil was formed. The ether was decanted and discarded. A minimum amount of butanol was added to the remaining oil and the entire solution again scratched with a laboratory stirring rod and refrigerated for a period of five days. At the end of five days some solid white material is obtained which is filtered. Then the precipitate was resuspended in cold butanol and refiltered. A crystalline white product was obtained which was dried in vacuo.

Example 2

5.4 grams of orthobenzylphenol dimethylaminoethyl ether hydrochloride was dissolved in ether and made basic by the addition of sodium hydroxide. A second solution was prepared by adding 6.6 grams of potassium penicillin to ether and acidifying with phosphoric acid. Both solutions were dried under anhydrous sodium sulfate, filtered and then added together. The resulting solution is scratched and seeded with crystals obtained by the procedures of Example 1. The whole was then refrigerated for a period of 24 hours and a white crystalline precipitate was obtained which was filtered and dried under vacuum.

Yield—9.2 grams, crystalline
Potency—891 u./mg.
Solubility—8000 u./cc.
Theoretical yield—10.9 grams
Theoretical potency—1051 u./mg.

While the present invention has been described with particular reference to the orthobenzylphenyl dimethylaminoethyl ether addition salts of penicillin G, it will be understood that orthobenzylphenyl dimethylaminoethyl salts of other penicillins are also included within the scope of this invention. For instance, the natural penicillins such as penicillin G, F, X, dihydro F, and K and mixtures of two or more of such penicillins, particularly such mixtures containing at least 85% penicillin G.

It will be understood that the reaction can be carried out in organic solvents other than ether. Examples of such solvents are butanol, propanol, amyl acetate, methyl amyl acetate, isopropyl ether, mesityl oxide, methyl isobutyl ketone.

Also other salts of orthobenzylphenyl dimethylaminoethyl ether other than the hydrochloride may be employed. Examples of such salts are phosphate, nitrate, hydrobromide, sulfate, citrate and tartrate. In general, any organic solvent soluble or water soluble salt may be employed.

It will be understood that, without departing from the spirit of the invention or the scope of the claims, various modifications may be made in the specific expedients described. The latter are illustrative only, and not offered in a restricting sense, it being desired that only such limitations shall be placed thereon as may be required by the state of the prior art.

I claim:
1. A salt of penicillin and orthobenzylphenol dimethylaminoethyl ether.
2. A salt of penicillin G and orthobenzylphenol dimethylaminoethyl ether.

ALPHONSE P. GRANATEK.

REFERENCES CITED

The following references are of record in the file of this patent:

UNITED STATES PATENTS

| Number | Name | Date |
| --- | --- | --- |
| 2,483,382 | Goldberg et al. | Sept. 27, 1949 |
| 2,493,625 | Goldberg et al. | Jan. 3, 1950 |
| 2,504,182 | Cooper | Apr. 18, 1950 |
| 2,527,810 | Goldberg et al. | Oct. 31, 1950 |

FOREIGN PATENTS

| Number | Country | Date |
| --- | --- | --- |
| 604,563 | Great Britain | July 6, 1948 |
| 607,004 | Great Britain | Aug. 24, 1948 |

OTHER REFERENCES

Salivar et al., "J. Am. Chem. Soc.," vol. 70, March 1948, p. 1287.

"Am. J. of Pharmacy," July, 1945, p. 253.

Monash, "Science," vol. 107, October 17, 1947, p. 370.

"Proc. Staff Meet. Mayo Clinic," December 10, 1947, p. 567.

Destouches et al., "Comptes Rendus," vol. 228, June 27, 1949, p. 2066.

Ballaro, "Ciencia e Investigacion," vol. 4, November 1948, pp. 481 and 482.

Merck Report CMR–M–XVb, March 31, 1944, published 1947, p. 1.

British Report CMR–Br 234, CPS–687; PB 79927, December 5, 1947 (published), pages 1 to 4.